United States Patent [19]
Christides et al.

[11] 3,907,136
[45] Sept. 23, 1975

[54] SYSTEM FOR PREVENTING DIGGING MACHINE FROM DAMAGING UNDERGROUND CONDUITS

[76] Inventors: Lee S. Christides, 47 Milrace Dr., East Rochester, N.Y. 14445; Harry L. Jensen, 234 Crittenden Way, Apt. No. 1, Rochester, N.Y. 14623

[22] Filed: Dec. 26, 1973

[21] Appl. No.: 428,121

[52] U.S. Cl...... 214/138 R; 37/DIG. 1; 37/DIG. 19; 214/762; 324/67
[51] Int. Cl.² ........................................ E02F 3/84
[58] Field of Search............... 214/138 R, 761, 762; 37/DIG. 1, DIG. 19; 324/41, 67

[56] References Cited
UNITED STATES PATENTS

| | | | |
|---|---|---|---|
| 3,190,476 | 6/1965 | Smith et al..................... | 214/138 R |
| 3,418,572 | 12/1968 | Humphreys.......................... | 324/67 |
| 3,617,865 | 11/1971 | Hakata................................ | 324/67 |

Primary Examiner—Albert J. Makay
Assistant Examiner—Ross Weaver
Attorney, Agent, or Firm—Stonebraker, Shepard & Stephens

[57] ABSTRACT

A transmitter produces an oscillating electric signal in the region where a digging tool is working, and the signal is powerful enough to induce a small current in any electrically conductive conduit buried in the region. Several sensor inductors are mounted on the digging tool and oriented so that an electromagnetic field around the conduit created by the induced current in the conduit induces a voltage in the sensor inductors as the tool approaches the conduit. A proximity signal is produced for each sensor inductor as a function of the respective induced voltages, the proximity signals are compared, and an output signal is produced whenever the proximity signals differ by a predetermined factor indicating approach of the tool to the buried conduit. The output signal is used to warn the operator or stop the machine.

15 Claims, 13 Drawing Figures

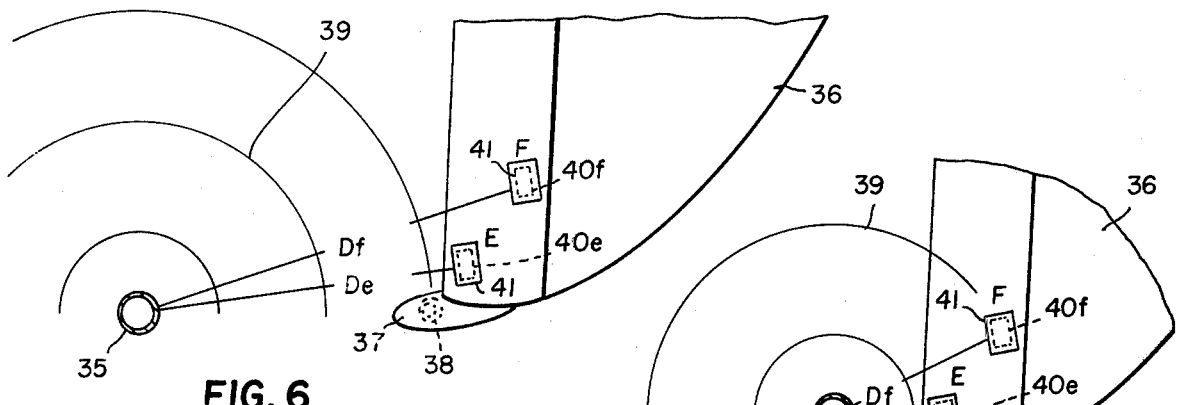
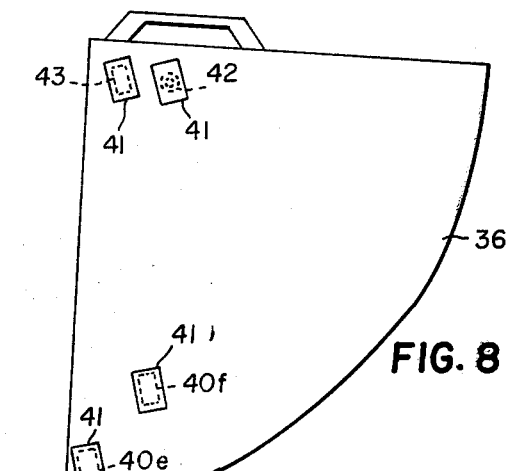
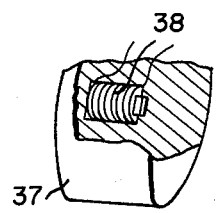
FIG. 6
FIG. 7
FIG. 8
FIG. 9
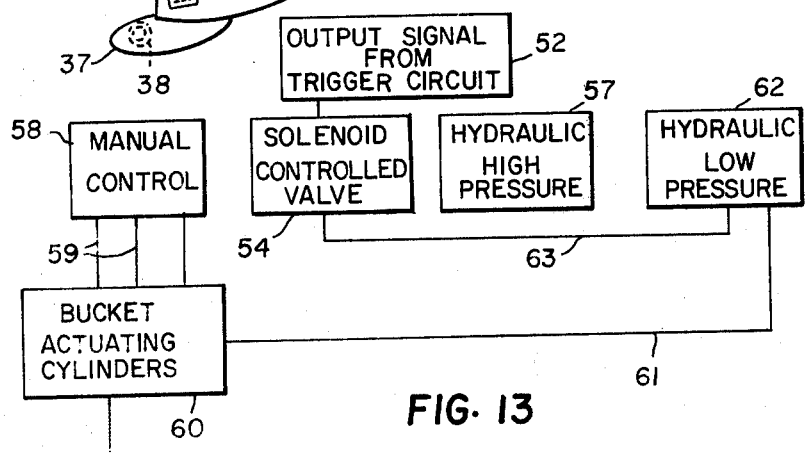
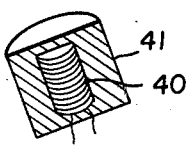
FIG. 10
FIG. 13
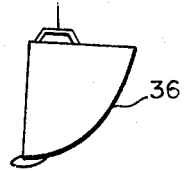
FIG. 11
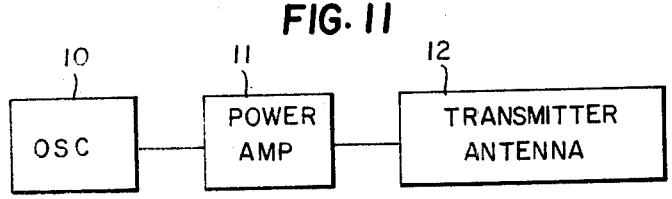

SYSTEM FOR PREVENTING DIGGING MACHINE FROM DAMAGING UNDERGROUND CONDUITS

THE INVENTIVE IMPROVEMEMT

Backhoes and other digging machines occasionally strike and break underground pipes, electric cables, telephone wires, etc. at considerable expense and inconvenience. Several suggestions have been made for preventing this by electrically charging the underground conduit so as to complete an electric circuit and produce a signal when the digging tool touches the underground conductor. This requires knowledge of the existence of the buried conduit and is expensive in necessitating electrical connections to the conduit. Also, such devices are generally unreliable in using either a highly variable ground resistance or requiring actual contact of the tool with the pipe before producing a signal.

The invention involves recognition of ways that a current can be produced in a buried conduit without connecting to the conduit or knowing it exists, and that the electromagnetic field around the conduit from the current in the conduit can be reliably detected by sensors on the digging tool itself to produce an output signal when the tool approaches close to the conduit and before the tool touches the conduit. The apparent problems involved make such a solution seem unworkable, but experimentation has shown that the problems can be solved and surprisingly reliable signals can be produced and used to warn the machine operator or automatically stop the machine. The invention aims at simplicity, economy, and reliability in detecting the approach of the digging tool to an underground conduit to prevent damage to the conduit.

SUMMARY OF THE INVENTION

The inventive system is for preventing a digging tool of a digging machine from damaging an underground conduit that is buried in a region where the tool is digging, said conduit having an electrically conductive path either from electrical conductivity of the conduit itself or from an electric conductor buried with the conduit to aid in detecting the conduit. It includes a transmitter for producing an oscillating current in the conductive path. Several sensor inductors are mounted on the digging tool near its digging edge and oriented so that an electromagnetic field around the conductive path created by the induced current in the conductive path induces voltage in the sensor inductors as the tool approaches the conductive path in any practical working orientation. Means responsive to each of the sensor inductors produce a proximity signal relative to each of the sensor inductors as a function of the respective voltages for each of the sensor inductors, the proximity signals are compared, and an output signal is produced whenever the proximity signals differ by a predetermined factor indicating approach of the tool to the buried conduit. The system preferably includes an operator warning device, or an automatic machine stopping device responsive to the output signal.

DRAWINGS

FIGS. 6 and 7 are fragmentary, schematic, side elevational views of a backhoe bucket provided with sensors according to the invention and approaching an underground conduit;

FIG. 8 is a partially schematic, side elevational view of a backhoe bucket provided with both sensor inductors and reference inductors according to the inventive system;

FIG. 9 is a partially cut-away, perspective view of a tooth for a digging machine having a recessed sensor inductor according to the invention;

FIG. 10 is a perspective view of a shield used for mounting sensor inductors on a digging tool according to the invention;

FIG. 11 is a schematic block diagram of a transmitter preferred for the inventive system;

FIG. 13 is a schematic block diagram of an hydraulic system for a digging machine equipped with an automatic stop according to the invention.

DETAILED DESCRIPTION

Figure 1:
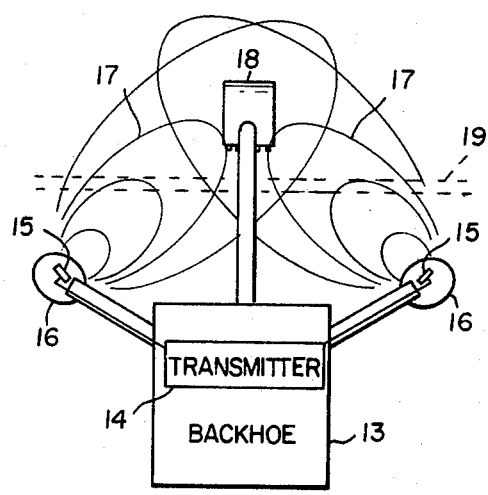
FIGS. 1 and 2 are schematic plan views of the backhoes provided with transmitters according to the invention.

The inventive system applies to digging machines which are predominantly backhoes, but it can also be applied to shovels, ditch diggers, drilling or boring tools, etc. Almost any digging tool that could strike and break an underground conduit could be prevented from doing so by proper application of the inventive system.

The underground conduits that can be detected by operation of the inventive system must have an electrically conductive path so that a current can be induced. This includes conduits that are electrically conductive themselves such as metallic water lines, gas lines, and other metallic pipes as well as electric or telephone cables, and it also includes wholly plastic or nonconductive conduits that are provided with an associated electrical path. Where plastic pipes are buried in the ground in modern installations, an electrically conductive wire encased in a plastic ribbon strip is often buried with the conduit to form an electrically conductive path that aids in detection of the conduit. An electric current can be induced in the conductor associated with the plastic conduit and this can serve to detect the location of the conduit to prevent damaging it with a digging tool.

In operating the inventive system, a transmitter produces an oscillating signal in one of several general ways described in detail below, and the signal is directed through the earth in the region where the machine is digging. If an electrically conductive path or conduit is buried in this region, the signal produces an alternating current in the conductive path as the field expands and collapses. The induced current in the conductive path produces an electromagnetic field around the conductive path that also expands and collapses as the current alternates. As sensor inductors mounted on the digging tool enter the electromagnetic field around the conductive path, a voltage is induced in the sensor inductors that can be used to detect the approach of the tool to the conduit. The sensor inductors are spaced and oriented on the digging tool so that the approach of the tool to the conductive path in any practical working orientation necessarily moves at least one sensor inductor closer to the conductive path than a related sensor inductor so that a comparison of the outputs of the sensor inductors reveals a significant difference between them, and the difference increases as the tool comes closer to the conductive path. This difference is used to produce an output signal, and preferably a first threshhold of difference produces an operator warning signal, and a second threshhold of difference, indicating closer approach to the conduit, automatically stops the digging machine. This is preferably accomplished by operating a valve in the hydraulic system of the digging machine.

As shown in FIG. 11, an oscillator 10 operates at a predetermined frequency which can vary widely depending upon the components selected for use in the system. A typical frequency would be in the range from 1K Hz to 10K Hz, but many other frequencies can also be used. The output of oscillator 10 is amplified by power amplifier 11 and is applied to electrode or a transmitter antenna 12 in any one of several ways to produce a current in any conductor buried in the region where the machine is digging.

Figure 3:
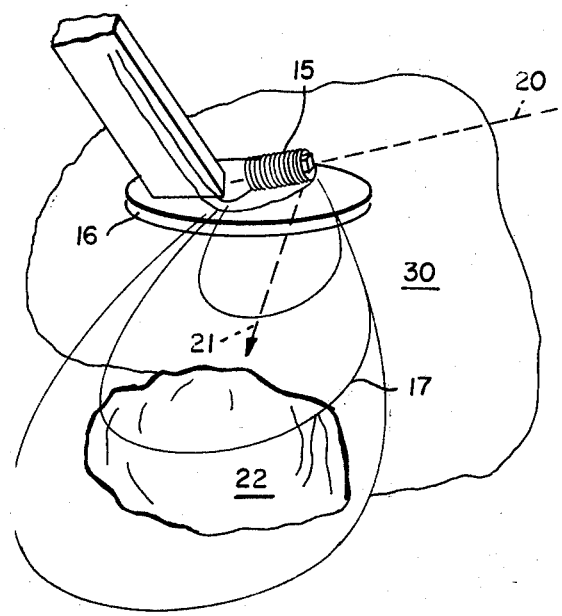
FIG. 3 is a fragmentary, perspective and schematic view of a stabilizer pad provided with a transmitter oriented for directing an electromagnetic field into a digging region.

One way to do this is shown in FIGS. 1 and 3 where backhoe 13 is provided with a transmitter 14 such as illustrated in FIG. 11 and has a pair of transmitting antenna coils 15 mounted on stabilizer pads 16 and oriented for transmitting a directional electromagnetic field into the region where bucket 18 is digging and where conduit 19 is buried. As best shown in FIG. 3, transmitter antenna 15 is formed as a coil having its axis 20 oriented to direct electromagnetic field 17 along a perpendicular 21 to axis 20 so that electromagnetic field 17 passes through digging region 22 out in front of stabilizer pad 16. Since buried conduit 19 in digging region 22 is in changing electromagnetic field 17 an alternating current is induced in conduit 19. The induced current in conduit 19 need not be very large, and 0.5 ma is sufficient.

Figure 2:
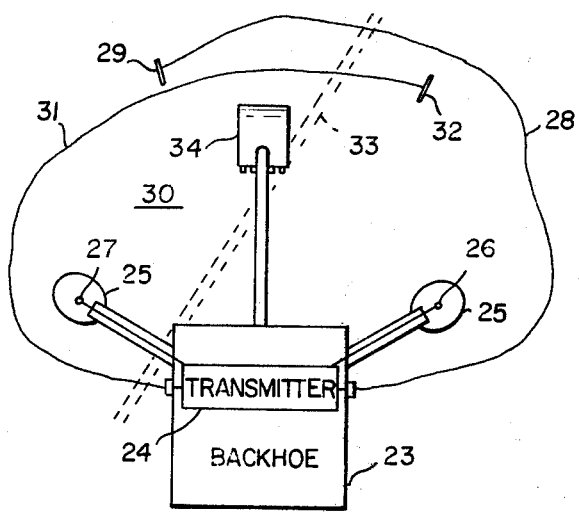

FIG. 2 shows another way of creating a current in a conductor buried in the digging region of backhoe 23 which is equipped with a transmitter 24 such as illustrated in FIG. 11. Stabilizer pads 25 for backhoe 23 support pin electrode 26 and 27 which extend a short way into the earth under pads 25. A signal of opposite phase to the signal applied to electrode 26 is applied through a lead wire 28 to a stake electrode 29 driven into the ground and spaced across digging region 30 from electrode 26 to produce an alternating difference of potential between electrodes 26 and 29. Similarly, a signal of opposite phase to the signal applied to a electrode 27 is fed through a wire 31 to a stake electrode 32 driven into the ground on the opposite side of digging region 30 from electrode 27 to produce an alternating difference of potential between electrodes 27 and 32. The alternating electrical potential between electrodes 26 and 27 and their corresponding stake electrodes 29 and 32, produces an alternating current in electrically conductive conduit 33 that allows it be be detected by sensors on bucket 34.

The operation of sensor inductors in detecting a buried conductor 35 is schematically illustrated in FIGS. 4 – 7 relative to a backhoe bucket 36. Each tooth 37 of bucket 36 has a recess containing an inductor coil 38. Inductor coils 38 can have many different forms including different numbers of turns of wire, different sized wire and different magnetic cores. Inductors having maximum outside dimensions of 2 centimeters or less are preferred and are suitable for practicing the invention, and these can be readily recessed into teeth 37.

Figure 4:
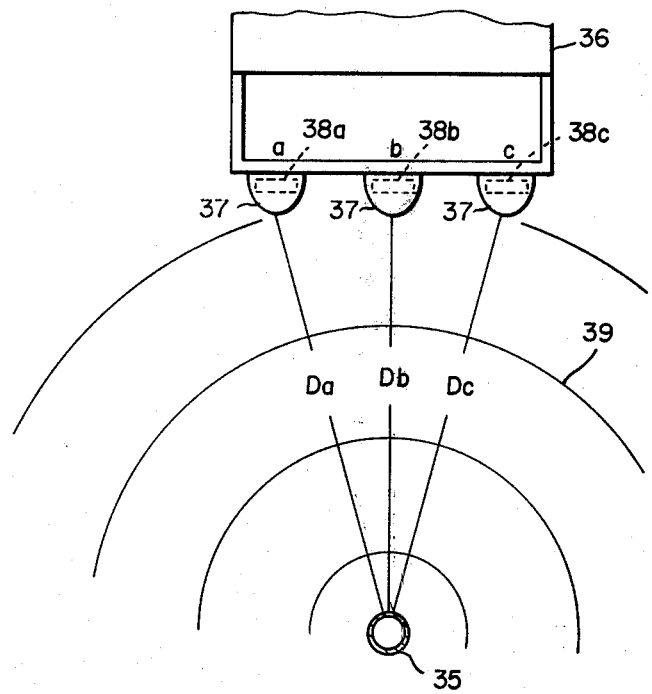
FIGS. 4 and 5 are fragmentary, schematic, front elevational views of a backhoe bucket provided with sensor inductors according to the invention and approaching an underground conduit.
Figure 5:
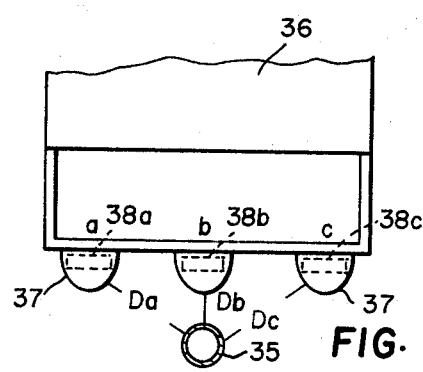

At first impression, there is considerable doubt as to whether the steel of bucket 36 and teeth 37 will not concentrate, distort, or affect the electromagnetic field 39 around conductor 35 such that insufficient voltage could be induced in inductors 38 to provide a useful signal. However, experimentation has shown that inductors 38 operate well enough to provide reliable signals even when recessed in steel. The voltage induced in a single inductor as it approaches conductor 35 is subject to so many variables that it could not provide a reliable conduit proximity signal. However, with several inductors 38 arranged in teeth 37 as shown in FIGS. 4 and 5 and approaching conductor 35 oriented approximately perpendicular to a line through inductors 38, sufficient voltages are induced in sensor inductors 38 to provide useful and reliable comparison signals.

When bucket 36 is spaced a safe distance from conductor 35, distances $a$, $b$, and $c$ from conductor 35 to sensor inductors 38 $a$, $b$, and $c$ are nearly equal, and the relatively small voltages induced in the three sensor inductors 38 are very nearly the same value. However, as bucket 36 approaches close to conductor 35 as shown in FIG. 5, the distances $a$ and $c$ to inductors 38$a$ and $c$ are much longer than the distance $b$ to inductor 38$b$. This induces a much larger voltage in sensor inductor 38$b$ than in sensor inductors 38$a$ and $c$ so that a comparison of the voltages of inductors 38 reveals a significant difference which is used to produce an output signal when the difference exceeds a predetermined threshhold. Any time the voltage induced in any one of the inductors 38 significantly exceeds the voltage induced in the other inductors 38, it indicates proximity to an underground conductor or conduit, and an output signal is produced to warn the operator to stop the machine.

Bucket 36 can also approach conductor 35 in the orientation shown in FIGS. 6 and 7 where substantially zero voltage would be induced in all the inductors 38 because of their orientation as teeth 37 approach conductor 35. To detect this approach, a pair of inductors 40$e$ and $f$ are mounted on each side of bucket 36. One way to do this is to house inductors 40 in protective shields 41 (FIG. 10) that are welded to the side of bucket 36. When bucket 36 is spaced from conductor 35 as shown in FIG. 6, the distances $e$ and $f$ from conductor 35 to inductors 40$e$ and $f$ are so nearly equal that the small voltages induced in inductors 40 are substantially the same. But as bucket 36 approaches closer to conductor 35 as shown in FIG. 7, distances $e$ and $f$ differ more substantially, and distinguishably different voltages are induced in inductors 40 $e$ and $f$. These voltages are used to form proximity signals that are compared to produce an output signal when the differences exceed a predetermined threshhold. Inductors 38 and 40 cooperate to produce an output signal for the approach of bucket 36 toward conductor 35 in any practical working orientation of bucket 36 and any angular orientation of conductor 35.

In some modes of operation, and particularly where an electromagnetic field 17 is directionally transmitted as schematically shown in FIG. 1, the transmitted electromagnetic field and ambient noise may themselves induce voltages in sensor inductors 38 and 40 on bucket 36 of FIGS. 4 – 8. This can substantially increase the total voltages induced in inductors 38 and 49 so that the small differences in the total induced voltage attributable to the relatively weak electromagnetic field 39 around conductor 35 is more difficult to detect. To remedy this, a pair of reference inductors 42 and 43 are mounted on bucket 36 remotely spaced from the digging edge in the region of teeth 37. Reference inductor 42 is oriented the same way as inductors 38 in teeth 37, and reference inductor 42 has the same orientation as sensor inductors 40 on the sides of bucket 36. Then the transmitted electromagnetic field or any ambient noise induces a voltage in reference inductors 42 and 43 to the same extent that it induces voltages in sensor inductors 38 and 40. The output of reference inductor 42 is subtracted from the outputs of each of the sensor inductors 38, and the output of reference inductors 43 is subtracted from each of the outputs of sensor inductors 40 to eliminate the effect of ambient noise and the transmitted electromagnetic field so that differences in the induced voltages in sensor inductors 38 and 40 from the electromagnetic field 39 around conduit 35 and more apparent and more easily detected. Reference inductors 42 and 43 are not quite so necessary for the arrangement illustrated in FIG. 2 where the difference in potential is applied directly through the ground from one electrode to another as explained above, although the reference conductors can still eliminate troublesome voltages induced in sensors 38 and 40 from ambient noise such as the electromagnetic field from power lines or radio transmitters.

Figure 12:
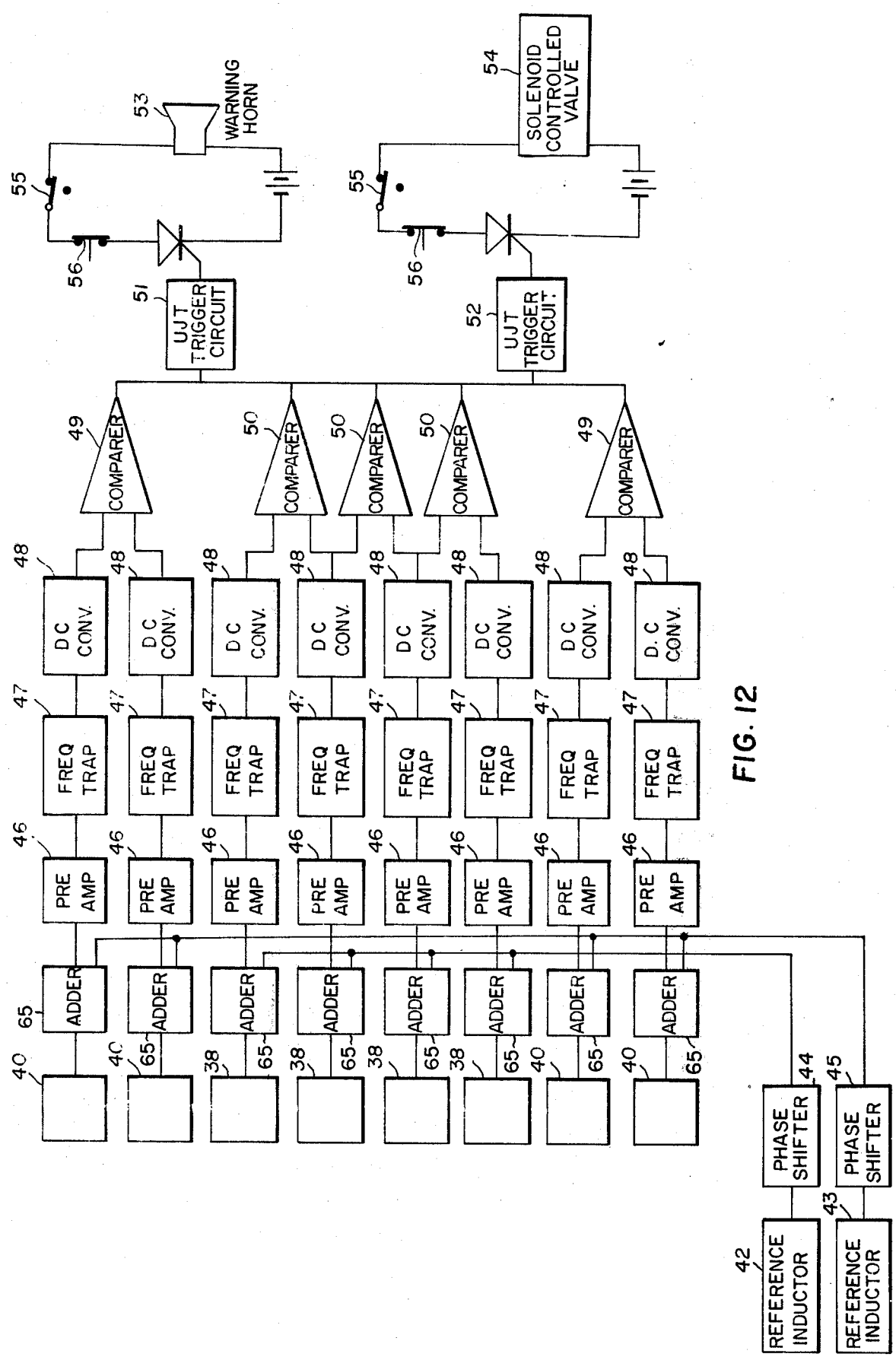
FIG. 12 is a schematic block diagram of a sensor inductor system including means for producing output signals for the inventive system.

FIG. 12 shows a schematic block diagram of the operation of the receiver and output signal producing means for a system such as applied to a four-tooth bucket 36 of FIG. 8. Two pairs of sensor inductors 40 are mounted on each respective side of bucket 36, and four sensor inductors 38 are mounted in the respective teeth 37 of bucket 36. Reference inductors 42 and 43 as previously described apply their induced reference voltages to phase shifters 44 and 45 which feed to adders 65 that add the results to the sensor inductor outputs as illustrated, with the output from reference inductor 43 and phase shifter 45 added to the outputs of inductors 40, and the output from reference inductor 42 and phase shifter 44 added to the outputs of sensor inductors 38. Pre amps 46 amplify the result, and frequency trap filters 47 eliminate noise and select signals in the frequency range of the transmitted signal. The output from filters 47 is covered to dc by converters 48 to produce a proximity signal for each sensor inductor. The proximity signals from each pair of sensor inductors 40 are fed to dc comparers 49, and the proximity signals from neighboring sensor inductors 38 are fed to dc comparers 50.

Thresholds for the comparisons are preferably established by uni-junction transistor trigger circuits 51 and 52 at two different levels so that when any of the proximity signal comparisons from comparers 49 and 50 exceed a first threshold set by trigger 51, an output signal is applied to horn 53 to warn the machine operator, and when any of the comparisons exceed a higher threshold to operate trigger 52, an output signal is applied to a solenoid-controlled valve 54 for automatically stopping the machine. Each of the output circuits preferably includes an override switch 55 and a reset switch 56.

FIG. 13 shows how the output signal from trigger 52 is applied to solenoid-controlled valve 54 to operate the hydraulic system of the machine for an automatic stop. A high pressure pump 57 supplies hydraulic energy for the machine through solenoid-controlled valve 54 to manual control unit 58 for selectively pressurizing lines 59 to operate bucket actuating cylinders 60 for moving bucket 36 as desired. Low pressure return line 61 conducts low pressure hydraulic fluid back to a low pressure reservoir 62 feeding pump 57.

When trigger 52 of the circuit of FIG. 12 applies an output signal to valve 54, valve 54 opens and by-passes high pressure hydraulic fluid from pump 57 back through line 63 to low pressure reservoir 62 to disable manual controls 58 and bucket actuating cylinders 60 so that bucket 36 stops. Solenoid-controlled valves can be arranged in other ways in hydraulic systems, and those skilled in the art will understand where to arrange a valve to accomplish the desired effect in any particular hydraulic system for a digging machine.

There are various ways that sensor inductors can be recessed into teeth or parts of a bucket or digging tool in the region of its digging edge. For example, steel plates can be fastened to the tool to provide conduits protecting wires from sensor inductors which can be recessed into the plates or recessed into teeth adjacent the plates. Those skilled in the art will understand various ways that this can be done, and the general principle is to protect the wires and the inductors in solid steel recesses around the perimeter of the digging tool as schematically illustrated in the drawings.

There are also many ways that electronic circuitry and components can be arranged for processing the outputs of sensor and reference inductors to produce proximity signals that can be compared to produce the desired output. Also, various frequencies, power levels, different types of inductors with different numbers of turns, different cores and air gaps can be used, and other parameter variations can be made in applying the system to various circumstances as will be apparent to those skilled in the art.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, different materials, components, and operating circumstances can be adjusted to any particular application of the inventive system as will be understood by those skilled in the art.

We claim:

1. A system for preventing a digging tool of a digging machine from damaging an underground conduit buried in a region where said tool is digging, said conduit having an electrically conductive path either from electrical conductivity of said conduit itself or from an electric conductor buried with said conduit to aid in detecting said conduit, said system comprising:

a. transmitter means for producing an oscillating current in said electrically conductive path;

b. a plurality of sensor inductors mounted on said digging tool in the region of a digging edge of said tool and oriented so that an electromagnetic field around said conductive path created by said induced current in said conductive path induces a voltage in said sensor inductors as said tool approaches said conductive path in any practical working orientation;

c. means responsive to each of said sensor inductors for producing a proximity signal relative to each of said sensor inductors as a function of the respective one of said voltages for each of said sensor inductors;

d. means for comparing said proximity signals;

e. means for producing an output signal whenever said proximity signals differ by a predetermined factor indicating approach of said tool to said buried conduit;

f. a reference inductor is mounted on said digging tool remotely spaced for said digging edge of said tool and oriented so that any ambient noise induces a voltage in said reference inductor, but said electromagnetic field created by said induced current in said buried conduit does not induce a detectable voltage in said reference inductor as said tool approaches said conduit in any practical working orientation; and g. means for subtracting said voltage induced in said reference inductor from said respective voltages induced in said sensor inductors to obtain said proximity signals relative to each of said sensor inductors.

2. The system of claim 1 wherein said sensor inductors are recessed into said digging tool.

3. The system of claim 2 wherein said machine is a backhoe, said digging tool is a backhoe bucket having teeth, and said sensor inductors are recessed into said teeth.

4. The system of claim 1 including means for warning an operator of said machine, and means responsive to said output signal for actuating said warning means.

5. The system of claim 1 including means for automatically stopping said machine, and means responsive to said output signal for actuating said machine stopping means.

6. The system of claim 5 wherein said machine includes hyraulic circuitry, and said machine stopping means includes a solenoid-operated valve in said hydraulic circuitry for stopping said digging tool upon operation of said valve.

7. The system of claim 1 wherein said transmitter means produces an oscillating electromagnetic field in said digging region, and said transmitted electromagnetic field is powerful enough to induce said current in said electrically conductive path.

8. The system of claim 1 wherein said transmitter means produces a difference of electrical potential across said digging region, and said difference in said electrical potential is sufficent to produce said current in said electrically conductive path.

9. The system of claim 1 wherein one group of said sensor inductors are spaced horizontally along said digging edge of said tool, and another group of said sensor inductors are spaced along a perpendicular to said horizontally spaced sensor inductors, and said comparing means compares said proximity signals from said one group of said sensor inductors and compares said proximity signals from said other group of said sensor inductors, and said output signal producing means produces said output signal whenever either of said comparisons of said proximity signals differ by said predetermined factor.

10. The system of claim 9 including a pair of said reference inductors, one of said reference inductors having the orientation of said one group of horizontally spaced sensor inductors, and another one of said reference inductors having the orientation of said other group of sensor inductors.

11. The system of claim 10 wherein said subtracting means subtracts the output of said one reference inductor from each of said sensor inductors of said one group and subtracts the output of said other reference inductor from each of said sensor inductors of said other group.

12. The system of claim 11 wherein said transmitter means produces an oscillating electromagnetic field in said digging region, and said transmitted electromagnetic field is powerful enough to induce said current in said electrically conductive path.

13. The system of claim 11 wherein said transmitter means produces a difference of electrical potential across said digging region, and said difference in said electrical potential is sufficent to produce said current in said electrically conductive path.

14. The system of claim 11 wherein said sensor inductors are recessed into said digging tool.

15. The system of claim 14 wherein said machine is a backhoe, said digging tool is a backhoe bucket having teeth, and said one group of said sensor inductors are recessed into said teeth, and said other group of said sensor inductors are mounted on the sides of said bucket.

* * * * *